(12) United States Patent
Belyaev

(10) Patent No.: US 7,990,513 B2
(45) Date of Patent: Aug. 2, 2011

(54) DISPLAY AND METHOD THEREOF

(75) Inventor: Viktor Vasilyevich Belyaev, Moscow District (RU)

(73) Assignee: Samsung Electronics Co., Ltd. (KR)

( * ) Notice: Subject to any disclaimer, the term of this patent is extended or adjusted under 35 U.S.C. 154(b) by 1162 days.

(21) Appl. No.: 11/691,527

(22) Filed: Mar. 27, 2007

(65) Prior Publication Data
US 2007/0222935 A1    Sep. 27, 2007

(30) Foreign Application Priority Data

Mar. 27, 2006 (RU) ................................ 2006109536

(51) Int. Cl.
*G02F 1/1339* (2006.01)
(52) U.S. Cl. ........................................ 349/155; 349/157
(58) Field of Classification Search .................. 349/155, 349/157
See application file for complete search history.

(56) References Cited

U.S. PATENT DOCUMENTS

| | | | | |
|---|---|---|---|---|
| 4,973,138 A * | 11/1990 | Yamazaki et al. | ............ | 349/157 |
| 5,399,390 A | 3/1995 | Akins | | |
| 5,627,395 A * | 5/1997 | Witek et al. | .................. | 257/350 |
| 5,699,139 A | 12/1997 | Aastuen et al. | | |
| 5,991,000 A * | 11/1999 | Shimabukuro et al. | ........ | 349/155 |
| 6,184,967 B1 | 2/2001 | Lagerwall et al. | | |
| 6,829,070 B2 * | 12/2004 | Adachi | .......................... | 359/245 |
| 6,972,406 B2 * | 12/2005 | Syms | .......................... | 250/281 |
| 7,643,100 B2 * | 1/2010 | Uehara et al. | .................... | 349/42 |
| 2002/0003519 A1 * | 1/2002 | Kim | ................................ | 345/87 |
| 2005/0077897 A1 * | 4/2005 | Syms | ............................. | 324/318 |
| 2006/0255255 A1 * | 11/2006 | Miller et al. | .................. | 250/281 |
| 2008/0258206 A1 * | 10/2008 | Hofmann | ...................... | 257/327 |
| 2009/0279012 A1 * | 11/2009 | Kuwabara et al. | ............. | 349/46 |

OTHER PUBLICATIONS

Stability of Externally Deformed ITO Films, Jeong-In Han; 2005 John Wiley & Sons, Ltd., ISBN 0-470-8704806, pp. 121-133.
Reliability of transparent conducting substrates for rollable displays: A cyclic loading investigation; S.P. Gorkhali, D.R. Cairns, G.P. Crawford; Journal of the SID 12/1, 2004, pp. 45-49.
Chapter 12: Mechanics of TFT Technology on Flexible Substrates; Sigurd Wagner, Helena Gleskova, 1-Chun Cheng, and James C. Sturm; Flexible Flat Panel Displays, 2005, Wiley [Imprint], Inc., pps. 1-20.

* cited by examiner

*Primary Examiner* — K. Cyrus Kianni
(74) *Attorney, Agent, or Firm* — Cantor Colburn LLP

(57) ABSTRACT

A flexible display including a first flexible substrate and a second flexible substrate, a plurality of electrodes and control microcircuits disposed on inner surfaces of both substrates, first channels disposed on the inner surface of the first flexible substrate and extending in a first direction, second channels disposed on the inner surface of the second flexible substrate and extending in a second direction, and a plurality of spacers disposed between the substrates. The inner surfaces of the substrates are substantially parallel and facing each other. The first direction and the second direction of the channels are inclined relative to each other. The spacers are disposed between the substrates in cross-points of the first channels and the second channels.

8 Claims, 2 Drawing Sheets

FIG.1.1
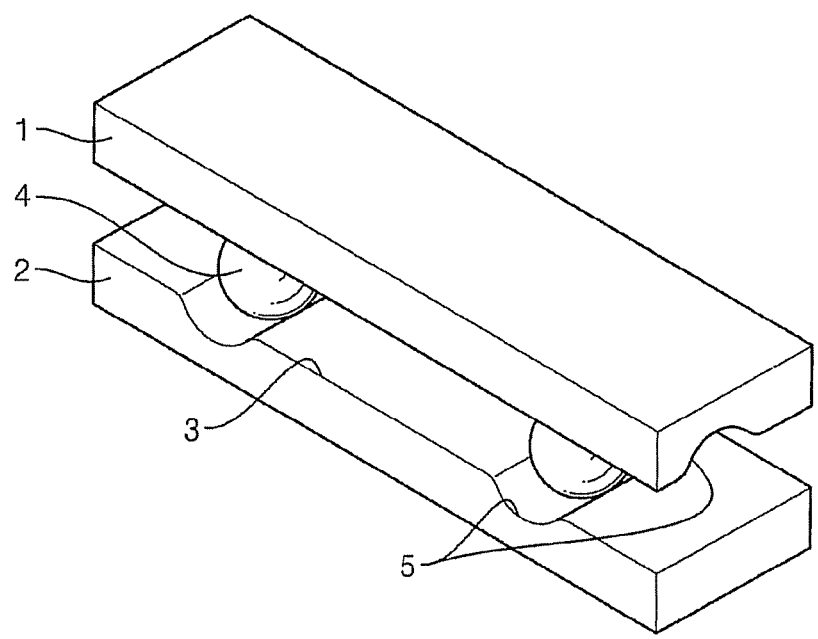
FIG.1.2
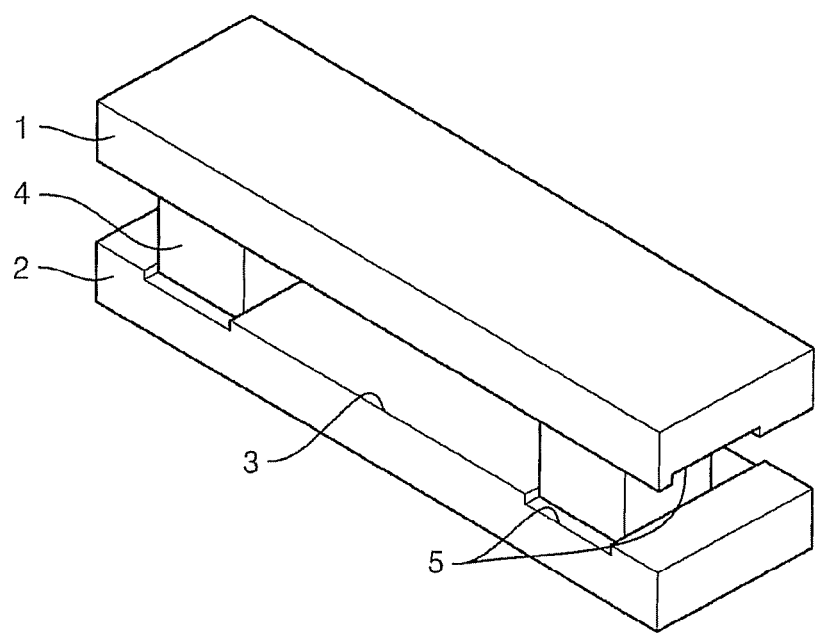

FIG.1.3
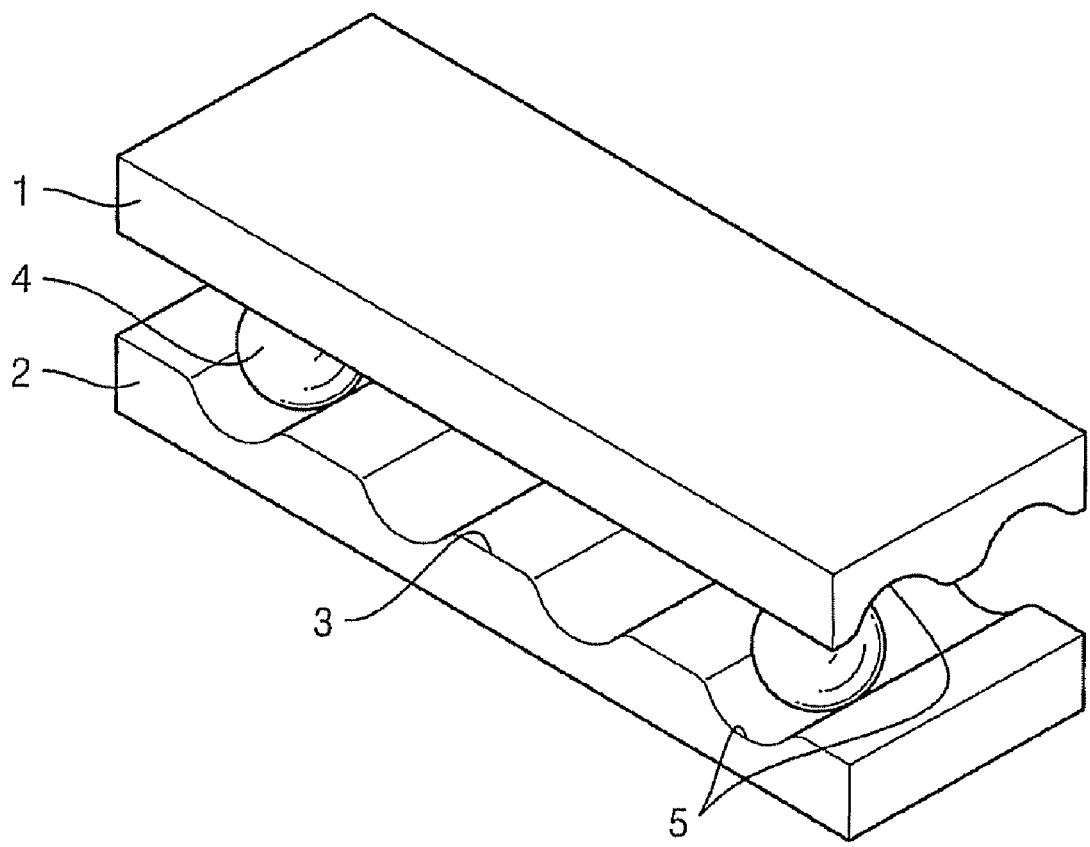

DISPLAY AND METHOD THEREOF

This application claims priority to Russian Patent Application No. 2006-109536 filed on Mar. 27, 2006, and all the benefits accruing therefrom under 35 U.S.C. §119, the contents of which are herein incorporated by reference in its entirety.

BACKGROUND OF THE INVENTION

1. Field of the Invention

The invention relates to electronic technologies, and, more precise, to devices for controlling intensity, color, phase, polarization or direction of light, in particular, to flexible displays.

2. Description of the Related Art

Flexible displays (e.g., liquid crystal, organic, electroluminescent, electrochromic) include plastic or metal substrates with electrodes and driving microcircuits on their interior surfaces. Between substrates are paddings, otherwise known as spacers. Substrates of flexible displays normally have flat surfaces.

Spacers are used for maintenance of the uniform clearance between the substrates and to assemble the substrates together. Spacers may also be used for diminution and the uniform redistribution of pressure over the surface of the substrate, such as from an external force. The spacers may be made as glass balls, hard polymeric blobs or columns grown and/or deposited on substrates. A liquid crystal display may include spacers in the form of uniform or non-uniform elements (e.g.,) blobs which are located between two flat substrates.

For redistribution of the pressure arising on a surface of the substrates and to minimize effects of a change of pressure in the active field or area of the display, a system of periodic dimples or channels may also be used. A liquid crystal display with two substrates may include dimples arranged in a periodic system on the substrates.

Another type of display contains two substrates with flat inner surfaces. On the one substrate, a set of the unidirectional channels (e.g., grooves) is located. These channels and the clearance between the substrates are filled by cholesteric liquid crystals for improvement of optical performance of the display. Spacers are located between the substrates without a link to channels position.

In displays with flat substrates and spacers, an exterior action (e.g., external force) on the display panel, in particular, a bend, can result in spacers disordering or moving to undesirable locations. Accordingly, increased clearance between substrates may be caused by the displaced spacers. Such disordering is caused by the lack of reliable fixation of the spacers. Moreover, there is a chance that a substrate would be separated or detached from the spacers when the external force is applied to the display. A substrate may separate from the spacers due to a stretching of both surfaces of the substrates (such as, increase of the upper substrate and decrease of the lower substrate), which leads to breaking of the links or connection between a substrate and a spacer.

Other disadvantages may include cracking and/or tearing of the electrodes and/or other hard coats fixed to the surface of substrates when an external force is applied and the display is bent. The cracking or tearing is often pronounced in places of contact of an electrode with the spacers, applying additional pressure (e.g., overload) on the electrodes. The above drawbacks decrease reliability of the display and the picture quality under the impact of an outside force.

BRIEF SUMMARY OF THE INVENTION

An exemplary embodiment provides a flexible display with enhanced reliability and better picture quality in spite of the adverse outside force applied to the display.

In an exemplary embodiment, a flexible display includes a first flexible substrate and a second flexible substrate, a plurality of electrodes and control microcircuits disposed on inner surfaces of both substrates, first channels disposed on the inner surface of the first flexible substrate and extending in a first direction, second channels disposed on the inner surface of the second flexible substrate and extending in a second direction, and a plurality of spacers disposed between the substrates. The inner surfaces of the substrates are substantially parallel and facing each other. The first direction and the second direction of the channels are inclined relative to each other. The spacers are disposed between the substrates in the cross-points of the first channels and the second channels.

In an exemplary embodiment, a depth of the channels is between about 1% and 40% of a height of the spacers.

In an exemplary embodiment, the inner surfaces of the substrates between the channels are planar.

In an exemplary embodiment, the inner surfaces of the substrates between the channels include regular or irregular microrelief.

In an exemplary embodiment, the electrodes and control microcircuits are disposed between adjacent channels.

In an exemplary embodiment, the electrodes and control microcircuits partially cover a surface of the channels.

In an exemplary embodiment, spacers are not disposed in the cross-points of the channels of one substrate and the inner surface of the other substrate that is partially covered by the electrodes.

In an exemplary embodiment, the spacers include an elastic material.

In an exemplary embodiment, the first direction and the second direction of the channels on facing surfaces of the substrates are inclined at an angle of about 1 degree up to about 90 degrees.

In an exemplary embodiment, channels have an elliptical multifaced cross section. The channels may form a polyhedron inscribed in an ellipse.

In an exemplary embodiment, the channels have multifaced section.

An exemplary embodiment provides a method of manufacturing a flexible display. The method includes forming a first flexible substrate and a second flexible substrate, inner surfaces of the first and second substrates being substantially parallel and facing each other, disposing a plurality of electrodes and control microcircuits on inner surfaces of the first and second substrates, forming first channels in the inner surface of the first flexible substrate and extending in a first direction, forming second channels in the inner surface of the second flexible substrate and extending in a second direction and disposing a plurality of spacers between the substrates. The first direction and the second direction of the channels are inclined relative to each other, and the spacers are disposed between the substrates at cross-points of the first channels and the second channels.

An exemplary embodiment provides increased reliability of a flexible display and picture quality in spite of an outside force applied to the display. A disordering of the spacers is reduced or effectively prevented, a clearance between the substrates is maintained and cracking of electrodes and other solid coats of the substrates is minimized. A lateral arrangement of the channels on facing (e.g., opposing) surfaces of the substrates is fixed due to placement of the spacers in the cross-points of the channels in facing surfaces of the substrates.

BRIEF DESCRIPTION OF THE DRAWINGS

The above and other features and advantages of the present invention will become more apparent by describing in detail embodiments thereof with reference to the attached drawings in which:

FIG. 1.1 is a perspective view of an exemplary embodiment of a flexible display including flat flexible substrates with channels having a substantially oval cross section;

FIG. 1.2 is a perspective view of an exemplary embodiment of a flexible display including flat flexible substrates with the channels having a substantially rectangular cross section; and FIG. 1.3 is a perspective view of an exemplary embodiment of a flexible display including flexible substrates having regularly spaced channels over a whole area of the substrate.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

An exemplary embodiment of a flexible display shown on FIGS. 1.1, 1.2 and 1.3, includes two flexible substrates 1 and 2 having electrodes 3, control microcircuits (not shown) on inner surfaces of substrates 1 and 2 and spacers 4 located between substrates 1 and 2. Substrates 1 and 2 include unidirectional and periodically arranged channels 5 on the inner surfaces thereof. In exemplary embodiments, the channels may be regularly (e.g., uniformly) spaced or irregularly spaced.

Dimples of channels 5 may have an oval, rectangular, curved or rectilinear shape (e.g., cross section. The shape of the channels corresponds to a shape spacers 4. As used herein, "dimples" is used to describe a portion of the channel 5 where the spacer 4 is substantially disposed. The dimple is defined at a farthest point of the channel 5 relative to the inner surface of the substrate and includes an adjacent surrounding portion (e.g., wall) of the channel where the spacer 4 is positioned.

As in the illustrated embodiments, channels 5 on facing surfaces of substrates 1 and 2 may extend in longitudinal and transverse directions, respectively. The channels 5 of substrate 1 extend in a direction substantially perpendicular to the channels 5 of substrate 2, but the invention is not limited thereto. Alternatively, channels 5 of the substrates may extend at an incline to outer edges of the substrates, e.g. in a diagonal arrangement such as when viewed on a plane.

In exemplary embodiments, directions of channels 5 relative to edges of the substrate in which it is disposed may make an angle of about 1 degree up to about 90 degrees. As in the illustrated embodiments, the angle of the channels 5 of both substrate 1 and substrate 2 is equal to about 90 degrees. Spacers 4 are located in cross-points of channels 5 between substrates 1 and 2. Cross-points may be considered as facing portions of channels 5 in substrates 1 and 2.

As illustrated in FIGS. 1.1 and 1.2, spacers 4 are located in each of the channels 5 of substrate 2. FIG. 1.3 shows the spacers 4 in a portion of the channels 5 of substrate 2. The spacers 4 may be arranged in a portion of or an entire of the channels 5 of a substrate as is suitable for the purpose described herein, such as to maintain the gap between the substrates When an external force is applied to the flexible display and causes a bending of the display (e.g., bending substrates 1 and/or 2), the spacers 4 maintain their position in a longitudinal and transverse direction because the walls of the dimples of the channels 5 restrict travel of the spacers 4 located inside the channels 5. Advantageously, a position of the spacers 4 is essentially fixed (e.g., constant) and a gap between the substrates 1 and 2 is maintained. In an exemplary embodiment, the spacers may include an elastic material.

A depth of the channel 5 taken in a direction substantially perpendicular to the inner surface of a substrate provides fixation of the spacer 4 and may be adjusted based on dimensions of the spacer 4. A height of the spacer 4 is taken in a direction substantially perpendicular to the inner surface of the substrate. For spherical spacers 4, a height may also be considered a diameter of the sphere. The depth of the channel 5 may range from about 1% up to about 40% of spacer 4 height. Ends or outer edges of spacers 4 are located in the dimples of the channels 5. The spacers 4 are arranged at intersections (e.g., cross points) of the channels 5 of the upper and inner substrates 1 and 2. A profile or shape of the ends of the spacers 4 corresponds to a shape of channels 5 including the dimples. The channels 5 are configured such that movement of the spacers is restricted and not altered by an external force deforming or bending the substrates.

Electrodes 3 are located between channels 5 on a substrate. The electrodes 3 may partially cover a surface (e.g., an inner surface) of the channels 5. A portion of the substrate between channels 5 may be considered a projection of the channel 5 toward a plane of the substrate. The projection may be defined by facing walls of adjacent channels 5. Spacers 4 are absent at the channels 5 projections of a substrate. The projection of the channel 5 may be covered, e.g., partially, by electrodes 3 or the electrodes 5 may be disposed at an entire of the projection of the channels.

In an exemplary embodiment, the inner surfaces of the substrates between the channels have regular or irregular microrelief. As illustrated in FIGS. 1.1 and 1.2, spacers 4 are located in the channels 5 of substrate 2. The spacers 4 are fixed by a portion of the channel 5 of substrate 1 facing the channel 5 of substrate 2. Projections of substrate 2 include electrodes 3 disposed thereon. The electrodes 3 disposed on the inner surface of substrate 2 partially cover the inner surface of substrate 2. Any of a number of electrodes 3 may be disposed between adjacent channels 5 on a substrate as is suitable for the flexible display.

Where electrodes 3 are not disposed on the inner surfaces of channels 5 serving as a base for the spacers 4, e.g., where spacers 4 are located, additional pressure is not created on the electrodes 3 at points of their contact with the spacers 4. Advantageously, cracking of electrodes 3 and/or other hard coats on substrates 1 and 2 at locations where the substrates bend is reduced or effectively prevented.

Although the above variant of implementation of the invention has been described with the purpose of illustration of the claimed invention, it should be clear to experts, that various modifications, additions and the replacements are possible if they do not go beyond the scope and sense of the invention as claimed.

What is claimed is:

1. A display comprising:
    a first substrate having a first channel;
    a second substrate having a second channel;
    a plurality of electrodes and microcircuits disposed on the first and second substrates; and
    a spacer disposed between the first and second substrates, wherein the spacer is disposed between the substrates in cross-portion of the first channel and the second channel, and
    the spacer includes an elastic material.

2. The display as in claim 1, wherein a depth of the channels is between about 1% and about 40% of a height of the spacer, the depth of the channels and the height of the spacer being taken in a direction perpendicular to inner surfaces of the substrates.

3. The display as in claim 1, wherein the electrodes and microcircuits are disposed between the adjacent channels.

4. The display as in claim 1, wherein the electrodes and microcircuits partially cover a surface of the channels.

5. The display as in claim 1, wherein a first direction of the first channel and a second direction of the second channel intersect each other at an angle within a range of about 1 degree to about 90 degrees.

6. The display as in claim 1, wherein the channels have an elliptical cross-section.

7. The display as in claim 1, wherein the channels have a rectilinear cross-section.

8. The display as in claim 1, wherein the spacer is disposed in each of the channels of the first substrate.

* * * * *